Feb. 3, 1942.   H. E. ALTGELT   2,271,533
TRACTOR PLOW
Original Filed Aug. 31, 1939   2 Sheets-Sheet 2
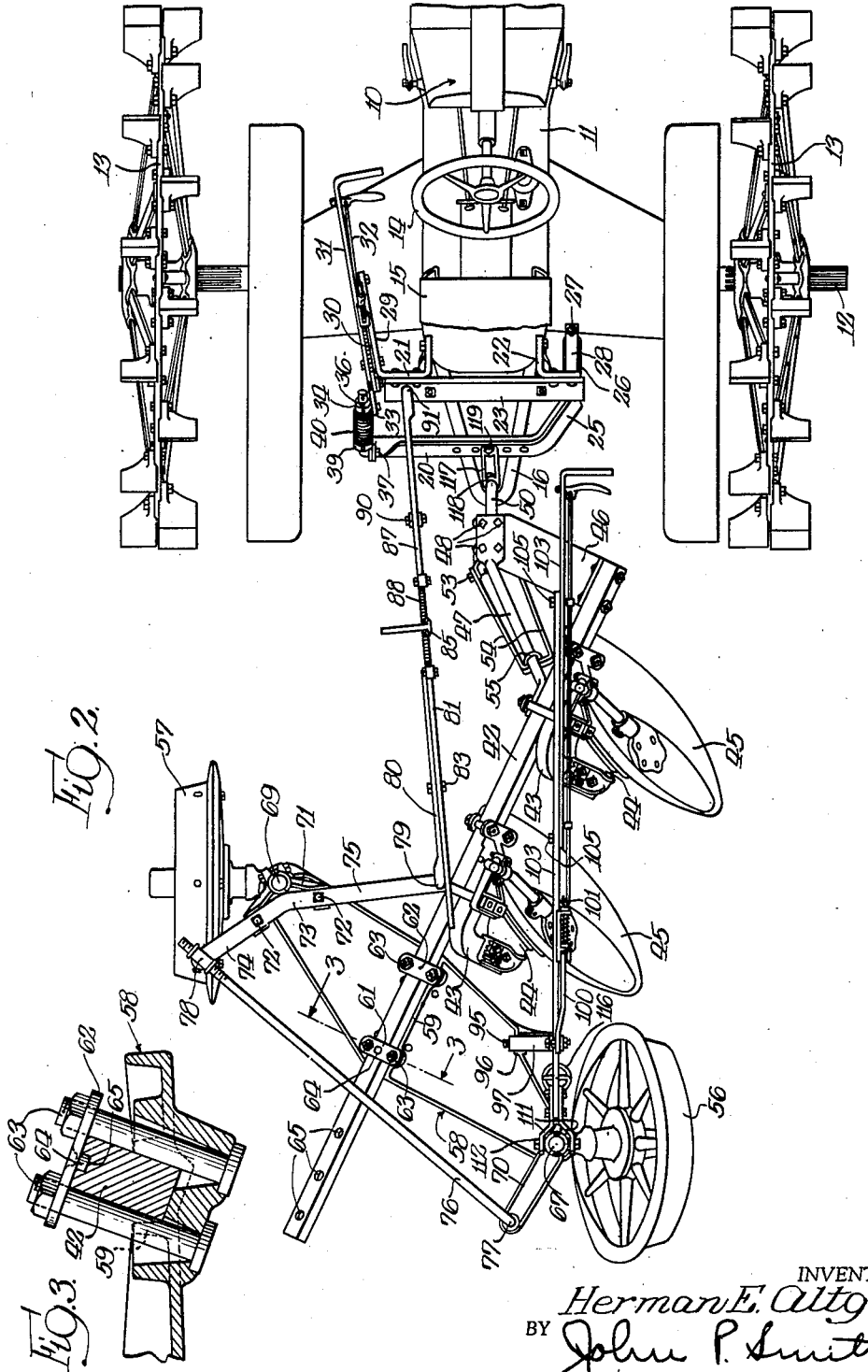
INVENTOR.
*Herman E. Altgelt,*
BY *John P. Smith*
ATTORNEY.

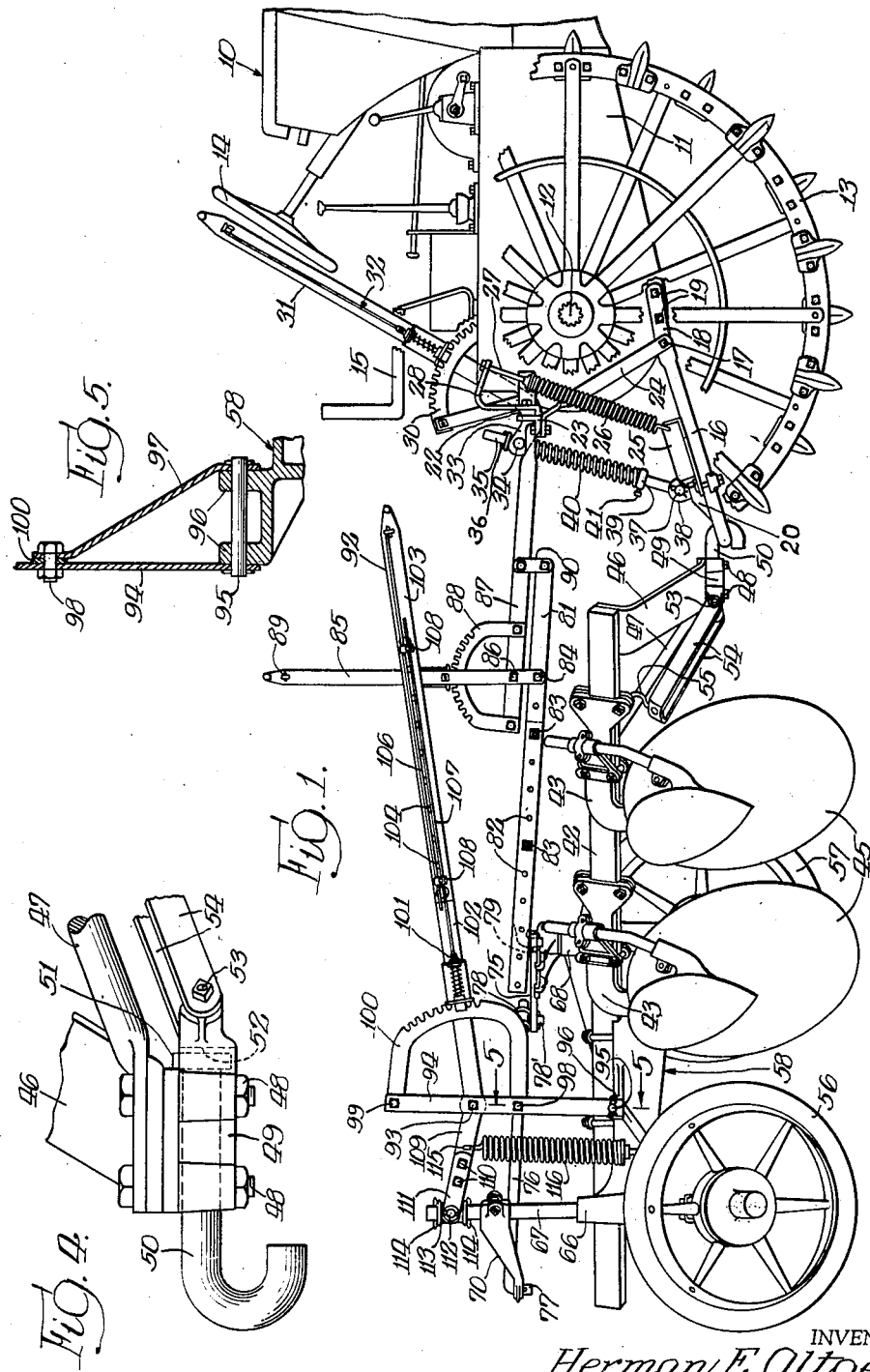

Patented Feb. 3, 1942

2,271,533

UNITED STATES PATENT OFFICE 2,271,533

TRACTOR PLOW

Herman E. Altgelt, South Bend, Ind., assignor to Oliver Farm Equipment Company, a corporation of Delaware Substituted for abandoned application Serial No. 292,883, filed August 31, 1939. This application July 26, 1940, Serial No. 347,783

15 Claims. (Cl. 97—47)

The present invention relates generally to tractor plows, but more particularly to an overhead beam disc plow and a special form of tractor hitch by means of which one end of the plow frame is supported on the tractor.

This case is a substitute for abandoned application No. 292,883 filed August 31, 1939.

The primary object of the invention is to provide a novel and improved plow construction of the overhead beam disc type in which one end thereof is pivotally attached and supported on the tractor in such a manner that either end of the plow may be adjusted for depth penetration and the steering of the land and furrow wheels controlled from the operator's seat on the tractor.

A further object of the invention is to provide a novel and improved overhead beam disc plow having a plurality of controls operable from the operator's seat of the tractor and in which the number of discs supported by the overhead beam may be increased or diminished by merely rearranging and adjusting the parts of the plow and its controls.

A still further object of the invention is to provide a novel and improved type of overhead beam disc plow in which the rear end of the beam is supported on the rear furrow wheel and land wheels while the front end of the beam is supported on and adjustable with respect to a novel and improved draw bar hitch of the tractor.

Another object of the invention is to provide a novel and improved construction of overhead beam type disc plow in combination with a novel and improved type hitch by means of which a swivel connection is provided between the plow and the tractor so that the plow as a whole may revolve or oscillate about a longitudinally and horizontally extending axis so as to accommodate the plow structure to hilly or uneven ground and to permit a backing up the tractor under rough field conditions without disconnecting the plow upon such operation.

These and other objects are accomplished by providing a construction and an arrangement of the various parts in the manner hereinafter described and particularly pointed out in the appended claims.

Referring to the drawings:

Fig. 1 is a side elevational view of a fragmentary portion of a conventional tractor illustrating the manner in which my improved plow construction is attached thereto;

Fig. 2 is a top plan view of the plow and tractor illustrated in Fig. 1;

Fig. 3 is a cross sectional view taken on the line 3—3 in Fig. 2;

Fig. 4 is a fragmentary side elevational view of the swivel connection between the draft frame and the plow frame; and Fig. 5 is a fragmentary cross sectional view taken on the line 5—5 in Fig. 1 of the drawings.

In illustrating one form of my invention I have shown the same in connection with a more or less conventional type of agricultural tractor, a fragmentary portion of which is shown in Figs. 1 and 2 of the drawings and generally indicated by the reference character 10. The tractor in this instance comprises the usual longitudinally extending main frame 11, rear axle 12, oppositely disposed rear traction wheels 13, steering mechanism 14 and operator's seat 15.

In connection with my improved overhead beam type disc plow, I have provided a novel and improved tractor hitch construction which is adapted especially for supporting one end of the plow beam in such a manner that the hitch may be adjusted to vary the depth penetration of the disc into the ground or raised to elevate the disc out of engaging position at the end of the field. The special tractor hitch in this instance is particularly adapted for my improved plow construction, but it will of course be understood that the same may be employed as a hitch for other agricultural implements. This hitch includes a V-shaped draw bar 16 which has its opposite forward ends pivoted as shown at 17 to oppositely disposed draft brackets 18, which in turn, are secured to the opposite portions of the tractor housing on the main frame 11 by means of bolts 19. Secured transversely at a point intermediate the ends of the draw bar 16 is an angle member 20. Arranged transversely with respect to the tractor frame and secured by means of right and left hand brackets 21 and 22 to the tractor frame 11 is a transverse angle bar 23. Each end of the angle bar 23 is reinforced by diagonal braces 24 which have their lower ends secured to the brackets 18 by the pivot bolts 17. Connected to a forwardly bent portion 25 of the transverse angle member 20 is a balancing spring 26 which has its upper end connected by means of a threaded bolt 27 to a bracket 28 which in turn is secured to the bracket 22 and transverse angle bar 23 as clearly shown in Fig. 1 of the drawings. Secured to a forwardly and outwardly projecting horizontal arm 29 of the bracket 21 is a lever sector 30. Pivotally connected to the sector 30 is an operating lever 31. The operating lever 31 is provided with a usual detent mechanism 32 for locking the same in various positions of adjustment. Formed integrally with and projecting rearwardly at a point below the pivot of the lever 31 is a curved arm 33. Pivotally connected as shown at 34 to the outer free end of the arm 33 is a swivel or buckle member 34. Slidably mounted in a vertically disposed bore in the buckle member 34 is a connecting rod 35. Adapted to be mounted in a variety of transverse apertures in the upper end of the rod 35 is a cotter pin 36. The lower end of the rod 35 is provided with right angularly bent portion so as to form the pivotal connection as shown at 37 to an upwardly turned end 38 of the transverse angle member 20. Mounted between the swivel member 34 and an adjustable collar 39 on the rod 35 is a pressure spring 40. The collar 39 embraces the rod 35 and is adjustably secured thereto by means of a set screw 41. Obviously from the construction thus far described it will be seen that the spring 40 normally resists upward pressure on the draft member 16, but should the discs of the plow strike an obstruction the spring 40 will yield and the rod 35 will slide through the buckle or swivel member 34 to permit the forward end of the plow frame to raise with respect to the tractor frame. It will also be observed that by the adjustment of the lever 31 the effective depth penetration of the front end of the plow may be regulated or the plow proper may be raised to inoperative position.

My improved plow construction in the present instance comprises a longitudinally extending substantially straight beam 42 which is diagonally disposed with respect to the longitudinal axis of the tractor. Rotatably secured to the beam at spaced intervals by means of arms 43 and spindle bearing brackets 44 are disc plows 45. Secured to the forward end of the beam 42 is a downwardly and angularly disposed draft plate 46. Extending from a point adjacent the forward end of the beam and secured thereto and to the forward end of the plate 46 is a diagonally disposed brace and supplemental draft member 47. Secured by means of bolts 48 to the supplemental draft members 46 and 47 is a draft bearing casting 49. Journaled in a longitudinally extending bore in the draft bracket 49 is a draft hook 50. The rear end of the draft hook 50 is provided with an enlarged head 51 which is adapted to engage a wall 52 formed in the bracket 49 should the occasion arise to back the tractor in order to release the plow when it strikes an obstruction. From this construction it will be obvious that by having the hook swivelly connected to the draft frame of the plow, that the plow frame may oscillate about a longitudinal axis with respect to the tractor frame or tractor hitch occasioned by travelling over uneven or hilly ground. The draft hook 50 of the plow is locked from disengagement from the draft bar 16 by a locking member or bracket 117 which has its rearward end curved so as to loosely engage the draft hook 50 and its forward end apertured so as to receive a bolt 119 for securing the bracket to the transverse angle member 20.

Pivotally attached as shown at 53 to the rear portion of the draft bracket 49 are supporting legs or rests 54 which are normally held in their inoperative position or the position shown in Figs. 1 and 2 of the drawings by a pivoted hook 55. The hook 55 is adapted to engage the supplemental draft rod 47 for holding the same in inoperative position. Should the operator be desirous of disconnecting the plow from the tractor hitch the rest or support 54 may be swung to a vertical position to support the forward end of the plow frame.

The rear end of the plow beam 42 is supported by a furrow wheel 56 on one side thereof and a land wheel 57 on the other side thereof. These supporting wheels are connected to the beams 42 by means of a large transverse casting generally indicated by the reference character 58. This casting 58 is provided with a longitudinal groove 59 in which the beam 42 is adjustably seated and secured. The casting is secured to the underside of the beam by means of transverse straps 61 and 62 and bolts 63. The strap 61 is provided with a downwardly projecting lug or pin as shown at 64 which is adapted to engage one of the series of apertures or recesses 65 spaced apart and located on the top side of the beam 42, for properly locating the casting 58 in various positions along the beam so that additional discs may be added in the manner hereinafter more fully described. Formed integrally with one end of the bearing casting 58 is a vertically disposed bearing barrel 66 in which is adjustably journaled the vertical portion 67 of the furrow wheel axle. Formed integrally with the other end of the casting 58 is a second vertically disposed bearing barrel 68 in which is journaled the vertical portion 69 of the land wheel axle. Rigidly secured adjacent the upper end of the furrow wheel axle is a crank arm 70. Rigidly secured to the upper end of the land wheel axle 69 is a crank bracket 71. Rigidly secured by means of bolts 72 to sockets formed in the crank bracket 71 is a lever member 73 so as to form in effect an outwardly projecting crank 74 and an inwardly projecting crank 75. The outer or free ends of the arms 70 and 74 are connected by an adjustable tierod 76. The rear end of the tierod 76 has a right angularly bent portion as shown at 77 for pivotally connecting the same to the free end of the arm 70. The other end of the tierod 76 is provided with an external threaded portion which engages in threaded engagement therewith a threaded sleeve or buckle 78. The threaded buckle is provided with a downwardly extending pin portion as shown at 78' to engage the outer or free end of the crank arm 74. Pivotally connected as shown at 79 to the outer or free end of the lever or arm 75 is a connection 80. The connection 80 is adjustably connected to a second connection 81. The connection 81 is provided with a plurality of apertures 82 in which bolts 83 may be inserted for lengthening or shortening the connection between these two operative parts. Pivotally connected as shown at 84 adjacent the forward end of the connection 81 is an operating lever 85. The operating lever 85 is pivotally connected as shown at 86 to a third connection 87. The forward portion of the connection or member 81 is positioned below, parallel to and co-extensive with the rear portion of the connection or member 87. Secured to the rear end of the connection 87 is a lever sector 88. The lever 85 is provided with the usual detent mechanism generally indicated by the reference character 89 for adjusting the lever 85 with respect to the sector 88. The forward end of the second connection 81 is pivotally connected to an intermediate portion of the third connection 87 by means of a link 90. The forward end of the connection 87 is pivotally connected as shown at 91 to the transverse angle bar 23, which in turn is secured to the tractor frame 11. It will be obvious from the above that the lever 85 is located within easy reach of the operator's seat 15 on the tractor so that upon a manipulation of the lever the angular position of the furrow wheel 56 and land wheel 57 may be adjusted so as to effectively change the angular position of these wheels in order to overcome any side draft occasioned by the contour or unevenness of the ground being plowed.

Another important feature of the present invention includes the provision for manually adjusting the rear furrow wheel and includes an operating mechanism or lever 92 which extends within easy reach of the operator's seat 15 on the tractor. The rear end of the lever 92 is pivoted as shown at 93 to a vertically extending standard 94. The lower end of the vertically extending standard 94 is pivoted on a pin 95 which in turn is journaled in two horizontally spaced vertical ears 96 formed integrally with the casting 58. The standard 94 is braced against lateral movement by a diagonal brace 97 which has its lower end pivoted on the pin 95 adjacent the inner ear 96 and its upper end secured to a bolt 98 intermediate the ends of the standard 94. Secured to the standard 94 by means of a bolt 98 and 99 is a lever sector 100. The lever 92 is provided with a detent mechanism generally indicated by the reference character 101 for locking the lever in various positions of adjustment with respect to the sector. The lever 92 in this particular instance is made of two sections 102 and 103. The section 103 is provided with a plurality of spaced apart apertures 104 through which the bolts 105 may be inserted for changing the effective length of the lever. In this connection the detent rod of the lever is made in two sections as shown at 106 and 107 and are adapted to be adjustably connected by clamping members 108 for effectively adjusting the length of the detent mechanism in accordance with the adjusted length of the lever. The purpose of having this lever and detent mechanism adjustable is to permit it to be lengthened in the event the casting 58 and the associated furrow and land wheels are removed rearwardly in order to accommodate the insertion of additional or more discs to the beam. Formed integrally with the rear end of the lever 92 is an arm 109. Secured to the arm 109 by means of bolts 110 are oppositely disposed fork-like members 111. The fork-like members 111 are pivotally connected to oppositely disposed bearing studs 112 of the buckle 113. The buckle 113 is journaled on the upper end of the furrow wheel axle and is held from displacement with respect thereto by upper and lower cotter pins 114. Pivotally connected as shown at 115 to the arm 109 of the lever 92 is a balancing or extension spring 116, the lower end of which is connected to an ear on the casting 58.

Summarizing the advantages and method of operation of my overhead beam type disc plow, it will be noted I have operatively connected the same through means of a novel tractor hitch on which one of the ends of the plow is entirely supported on the tractor so that all the operating levers essential to the manipulation and control of the plow are within easy reach of the operator's seat on the tractor. In this connection it will also be noted that the manually adjusting lever for adjusting the hitch is so arranged with respect to the plow structure that the depth penetration of the discs carried by the plow may be regulated thereby or elevated to inoperative position by the manipulation of that lever for making the turns at the end of the field or for transporting purposes. Should the plow structure exert side draft on one side or the other of the plow by reason of the contour of the ground, the land and furrow wheels may be angularly adjusted with respect to their vertical axis by manipulating the lever 85 from the operator's seat on the tractor. The furrow wheel 56 may be adjusted for regulating the depth penetration of the disc through the medium of the lever 92 which is within easy reach of the operator's seat on the tractor. The sector 100 and operating lever 9 in this instance is pivotally mounted on a vertical standard 94 which in turn is braced against lateral movement by a brace bar 97 on a pin 95 as clearly shown in Fig. 5 of the drawings. The arrangement of the spring 116 connecting the arm 109 of the lever 92 affords a novel arrangement for balancing the rear end of the plow frame and assisting the manipulation of the lever. From the above description it will also be noted that by having the main casting 58 adjustable longitudinally of the beam 42 so that the pin 64 of the strap 61 may engage a variety of apertures 65 in the top surface of the beam 42, the furrow wheel 56 and land wheel 57 may be moved longitudinally of the beam at definite intervals for the insertion of additional discs 45. When this is done the lever 92 and its associated detent mechanism as well as the connections 80 and 81 of the lever 85 may be lengthened so as to adapt the operating or control mechanism in conformity with the extended length of the plow structure.

Should the operator desire to disconnect the plow from the draft frame of the tractor the foot rest 54 is lowered to vertical position, the locking bracket 117 removed by removing the bolt 119 from the transverse angle member 20 and by disconnecting the connection 87 from the transverse frame member 23 the tractor may be backed to disengage the draft bar 16 from the draft hook 50.

As hereinbefore pointed out, the draft hook 50 is swivellingly connected on a longitudinal axis in the draft bracket 49 so that the plow structure as a whole may revolve about a longitudinal and horizontal axis with respect to the tractor frame so as to accommodate the plow to the unevenness of the ground. At the same time the draft hook 50 with its locking bracket 118 permits the backing of the tractor without disengaging the plow therefrom.

While in the above specification I have described one embodiment which my invention may assume in practice, it will of course be understood that the same is capable of modification and that modification may be made without departing from the spirit and scope of the invention as expressed in the following claims.

What I claim is my invention and desire to secure by Letters Patent is:

1. The combination with a tractor of an overhead beam type plow attached thereto, means for supporting one end of said beam on said tractor, a land wheel pivoted to said beam adjacent the rear end of said beam, a furrow wheel pivoted adjacent the rear end of said beam, a tierod connecting said wheels together, two longitudinally extending members connecting said wheels with said tractor, and a lever having substantially vertically spaced apart pivots on the adjacent portions of said members for controlling the angularity of said wheels.

2. The combination with a tractor of an overhead beam type plow attached thereto, means for supporting one end of said beam on said tractor, a land wheel pivoted to said beam adjacent the rear end of said beam, a furrow wheel pivoted adjacent the rear end of said beam, a tierod connecting said wheels together, manually operable means including two partially co-extensive members operatively connecting said tierod with the frame of said tractor, and a lever pivotally connected to the adjacent portions of said members whereby upon the operation of said lever the angularity of said wheels may be controlled.

3. The combination with a tractor of a plow attached thereto having one end supported on said tractor, land and furrow wheels supporting the rear end of said plow, said land and furrow wheels angularly adjustable with rspect to said plow for controlling the side draft of said plow, operative connections between said wheels and said tractor for adjusting the angularity of said wheels, a swivel draft hook journaled on a longitudinal axis forming the connection between said plow and said tractor whereby said plow may follow the uneven contour of the ground independent of said tractor, and a locking bracket carried by said tractor and engageable with said draft hook for locking said draft hook to said tractor.

4. The combination with a tractor of a plow attached thereto having one end supported on said tractor, land and furrow wheels supporting the rear end of said plow, said land and furrow wheels angularly adjustable with respect to said plow for controlling the side draft of said plow, operative connections between said wheels and said tractor for adjusting the angularity of said wheels, a draft hook journaled on a longitudinally extending axis on said plow for permitting said plow to oscillate laterally with respect to said tractor, and means carried by said tractor and engageable with said draft hook for locking said draft hook to said tractor.

5. The combination with a tractor of an overhead beam disc plow having one end of said beam supported on said tractor, discs carried by said beam, land and furrow wheels supporting the other end of said beam, said wheels angularly adjustable with respect to said beam, manually adjustable means including two longitudinally extending parallel members having their adjacent portions co-extensive with one another and a manual operative lever pivoted to the co-extensive portions of said members for controlling the angularity of said wheels, and means for longitudinally adjusting said wheels with respect to said beam whereby additional discs may be mounted on said beam.

6. The combination with a tractor of an overhead beam disc plow having one end of said beam supported on said tractor, discs carried by said plow, land and furrow wheels for supporting the other end of said beam, means for operatively connecting said wheels together, means for connecting said wheels with said tractor, and manual operative means including two longitudinally extending parallel members having portions co-extensive with one another and a manually operable lever pivoted to the co-extensive portions of said members for controlling the angularity of said wheels.

7. The combination with a tractor of an overhead beam disc plow having one end of said beam supported on said tractor, discs carried by said plow, land and furrow wheels for supporting the other end of said beam, means for operatively connecting said wheels together, adjustable means for connecting said wheels to said tractor including two longitudinally extending members having their adjacent portions co-extensive with one another, and a lever pivotally connected to the adjacent portions of said members and operable from the operator's seat on said tractor for controlling the angularity of said wheels.

8. The combination with a tractor of a disc plow including a diagonally disposed beam, a plurality of spaced apart discs carried by said beam, a hitch forming the connection between one end of said beam and said tractor including a V-shaped draw bar, said draw bar having forward end pivoted to said tractor, a lever mounted on said tractor, operative connections between said lever and said draw bar for adjusting one end of said beam and a swivel draft hook journaled on a longitudinal axis adjacent the forward end of said beam for permitting said plow to follow the uneven contour of the ground independent of said tractor.

9. The combination with a tractor of a plow having one end supported thereon, furrow and land wheels supporting the other end of said plow, means for vertically adjusting said furrow wheel with respect to said plow including a standard pivoted to said plow, a manually operable lever pivoted to said standard, operative connections between said lever and said furrow wheel, and a balancing spring between said lever and said plow.

10. The combination with a tractor of a plow having one end supported thereon, furrow and land wheels having vertically disposed axle portion journaled on and supporting the other end of said plow, means for vertically adjusting said furrow wheel with respect to said plow including a vertically disposed standard pivoted to said plow, a lever pivoted to said standard and projecting forwardly with respect to its pivot, said lever having a rearwardly projecting portion operatively connected to the vertically extending portion of said furrow wheel axle, and a spring positioned between the rear portion of said lever and said plow for counterbalancing the weight on said lever.

11. The combination with a tractor of a plow including a diagonally disposed beam having one end supported on said tractor, discs carried by said beam, a transversely disposed casting adjustably secured to said beam, bearing barrels located at the opposite sides of said casting, land and furrow wheel axles journaled in said bearing barrels, means engageable with depressions in said beam for definitely locating said casting in certain positions along said beam whereby additional discs may be added to said plow, and means for clamping said casting to said beam.

12. The combination with a tractor of a plow including a diagonally disposed beam having one end supported on said tractor, discs carried by said beam, a transversely disposed casting adjustably secured to said beam, bearing barrels located at the opposite sides of said casting, land and furrow wheel axles journaled in said bearing barrels, and transverse straps for clamping said casting to said beam, certain of said straps having a projection engageable with certain recesses in said beam for aiding additional discs to said plow.

13. The combination with a tractor, of an overhead beam type plow attached thereto, means for supporting one end of said beam on said tractor, a land wheel pivoted to said beam adjacent the rear end thereof, a furrow wheel pivoted adjacent the rear end of said beam, a tie-rod connecting said wheels together, operative connections between said tie-rod and the frame of said tractor including two longitudinally and relatively movable members, and means pivotally connected to both of said members for controlling the angularity of said wheels.

14. The combination with a tractor, of an overhead beam type plow attached thereto, means for supporting one end of said beam on said tractor, a land wheel pivoted to said beam adjacent the rear end thereof, a furrow wheel pivoted adjacent the rear end of said beam, a tie-rod connecting said wheels together, operative connections between said tie-rod and the frame of said tractor including two longitudinally and relatively movable members, and a lever pivotally connected to both of said members and operable from the tractor seat on said tractor for controlling the angularity of said wheels.

15. The combination with a tractor, of an overhead beam type plow attached thereto, means for supporting one end of said beam on said tractor, a land wheel pivoted to said beam adjacent the rear end thereof, a furrow wheel pivoted adjacent the rear end of said beam, a tie-rod connecting said wheels together, operative connections between said tie-rod and the frame of said tractor including two longitudinally and relatively movable members, a locking sector mounted on one of said members, a lever pivoted to said last named member and operatively connected to said sector, and means for connecting the other of said members to said lever for controlling the angularity of said wheels.

HERMAN E. ALTGELT.